United States Patent
Baveja et al.

(10) Patent No.: US 12,477,209 B2
(45) Date of Patent: Nov. 18, 2025

(54) INFORMATION PROCESSING SYSTEM, IMAGE PROCESSING METHOD, AND IMAGE PROCESSING PROGRAM

(71) Applicant: LENOVO (SINGAPORE) PTE. LTD., Singapore (SG)

(72) Inventors: Upendra Baveja, Yokohama (JP); Shigefumi Odaohhara, Yokohama (JP); Takumi Imai, Yokohama (JP); Takeshi Komuro, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 108 days.

(21) Appl. No.: 18/457,497

(22) Filed: Aug. 29, 2023

(65) Prior Publication Data

US 2024/0147049 A1    May 2, 2024

(30) Foreign Application Priority Data

Nov. 1, 2022    (JP) ................. 2022-175516

(51) Int. Cl.
*H04N 23/611* (2023.01)
*G06V 40/16* (2022.01)

(52) U.S. Cl.
CPC .......... *H04N 23/611* (2023.01); *G06V 40/166* (2022.01)

(58) Field of Classification Search
CPC ...... H04N 23/611; H04N 7/147; H04N 23/69; H04N 23/695; H04N 7/15; H04N 23/80; G06V 40/166; G06V 40/161
See application file for complete search history.

(56) References Cited

U.S. PATENT DOCUMENTS

| | | | |
|---|---|---|---|
| 8,908,057 B2* | 12/2014 | Yoshizumi | H04N 23/64 348/222.1 |
| 2008/0285817 A1* | 11/2008 | Imamura | H04N 23/611 382/118 |
| 2009/0185056 A1* | 7/2009 | Okamoto | H04N 23/698 348/240.99 |
| 2017/0094184 A1 | 3/2017 | Gao et al. | |
| 2017/0213385 A1* | 7/2017 | Yu | H04N 7/185 |
| 2018/0270426 A1 | 9/2018 | Ogawa | |
| 2021/0067701 A1 | 3/2021 | Tagra et al. | |
| 2021/0321043 A1* | 10/2021 | Arora | H04N 23/611 |

FOREIGN PATENT DOCUMENTS

| | | |
|---|---|---|
| JP | 2010147712 A | 7/2010 |
| JP | 2010147769 A | 7/2010 |
| JP | 2013016923 A | 1/2013 |
| JP | 2016122875 A | 7/2016 |
| JP | 2018022999 A | 2/2018 |
| JP | 2018538712 A | 12/2018 |
| JP | 2020057901 A | 4/2020 |

* cited by examiner

*Primary Examiner* — Mekonnen D Dagnew
(74) *Attorney, Agent, or Firm* — SHIMOKAJI IP

(57) ABSTRACT

An information processing system includes a camera, a face detection unit that detects faces included in an image acquired by the camera, a parameter setting unit that sets a reaction parameter for framing according to the number of the detected faces, and a framing unit that performs framing of the image using the set reaction parameter. The parameter setting unit sets the reaction parameter, for example, so that the framing reaction is slower as the number of faces included in the image increases.

9 Claims, 6 Drawing Sheets

| NUMBER OF FACES | 1 ≤ n < 3 | 3 ≤ n < 6 | 6 ≤ n |
|---|---|---|---|
| REACTION PARAMETER | 3 | 2 | 1 |

| NUMBER OF FACES | 1 ≤ n < 3 | 3 ≤ n < 6 | 6 ≤ n |
|---|---|---|---|
| SENSITIVITY PARAMETER | 3 | 2 | 1 |
| VELOCITY PARAMETER | 3 | 2 | 1 |

INFORMATION PROCESSING SYSTEM, IMAGE PROCESSING METHOD, AND IMAGE PROCESSING PROGRAM

BACKGROUND OF THE INVENTION

Field of the Invention

This disclosure relates to an information processing system, an image processing method, and an image processing program.

Description of the Related Art

In recent years, video-conferencing has become more and more common, and thereby camera modules with functions suitable for video-conferencing have been proposed. For example, a camera module with a built-in visual processing unit (VPU) has been proposed to realize more natural video-conferencing by automatically performing framing (adjusting the viewing angle).

This type of camera module detects the position and area of a person in an image, sets a region of interest (ROI) on the basis of the detection result, and automatically adjusts the image on the basis of the region of interest and the resolution of the output image.

SUMMARY OF THE INVENTION

Frequent auto-framing of an image causes the image to shake vertically and horizontally as well as in the depth direction (zoom in/out). Such shaking tends to be more pronounced when there are more people in the frame, which may degrade user experience.

This disclosure has been made in view of these circumstances. The object of this disclosure is to provide an information processing system, an image processing method, and an image processing program capable of improving user experience.

The first aspect of the present disclosure is an information processing system including: a camera; a face detection unit that detects faces included in an image acquired by the camera; a parameter setting unit that sets a reaction parameter for framing according to the number of detected faces; and a framing unit that performs framing of the image using the set reaction parameter.

The second aspect of the present disclosure is an image processing method, in which a computer detects faces included in an image acquired by a camera, sets a reaction parameter for the framing according to the number of detected faces, and performs framing of the image using the set reaction parameter.

The third aspect of this disclosure is an image processing program for causing a computer to perform the above image processing method.

According to the information processing system, the image processing method, and the image processing program of the present disclosure, there is achieved an effect to improve user experience.

DETAILED DESCRIPTION OF THE INVENTION

First Embodiment

The following describes one embodiment of an information processing system, an image processing method, and an image processing program according to a first embodiment of the present disclosure with reference to drawings. As an example of the information processing system, a camera module 1 is hereinafter illustrated for description.

Figure 1:
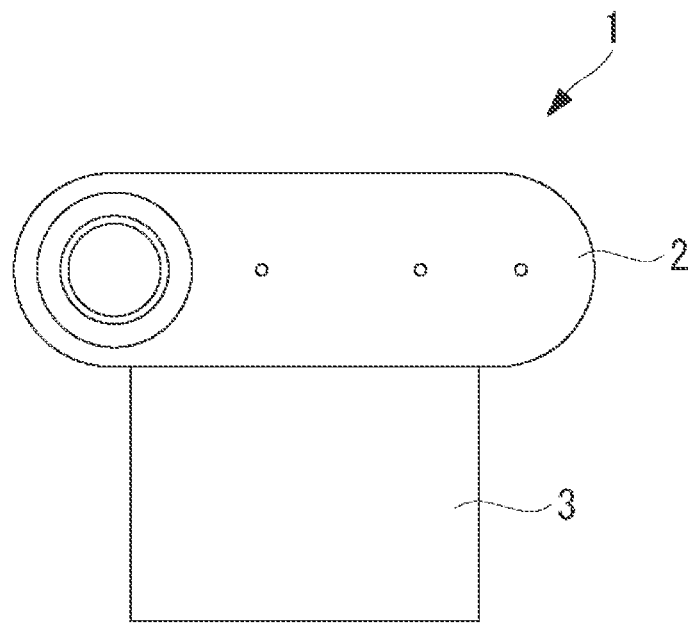
FIG. 1 is an external view of an example of a camera module according to a first embodiment of the present disclosure.

FIG. 1 is an external view of an example of a camera module 1 according to the present embodiment. As illustrated in FIG. 1, the camera module 1 has a camera 2 and a chassis 3 that supports the camera 2 and accommodates various electronic components that constitute an image processing unit 10 described later.

The camera 2 includes, for example, a lens, a lens driver, an image sensor, and the like. The lens captures light from a subject and forms an image of the subject on the image sensor. The image sensor converts the light captured by the lens into a signal charge to take the subject image. The image sensor, for example, generates analog image signals by capturing red (R), green (G), and blue (B) signal values in the order corresponding to a Bayer array, and outputs image data (RAW data), which is obtained by converting the obtained image signals from analog to digital format, to the image processing unit 10. The camera 2 may be any known camera.

The image processing unit 10 (see FIG. 3) performs predetermined signal processing (image processing) on the image data (RAW data) output from the camera 2. For example, the image processing unit 10 performs various processes such as automatic exposure adjustment, automatic white balance adjustment, matrix processing, contour enhancement, luminance compression, gamma processing, and the like on the RAW data. Furthermore, the image processing unit 10 analyzes image data and performs auto-framing. The details of auto-framing are described later.

The image data processed by the image processing unit 10 is, for example, output to an information processing device with a display via a communication medium, and is displayed on the display.

Figure 2:
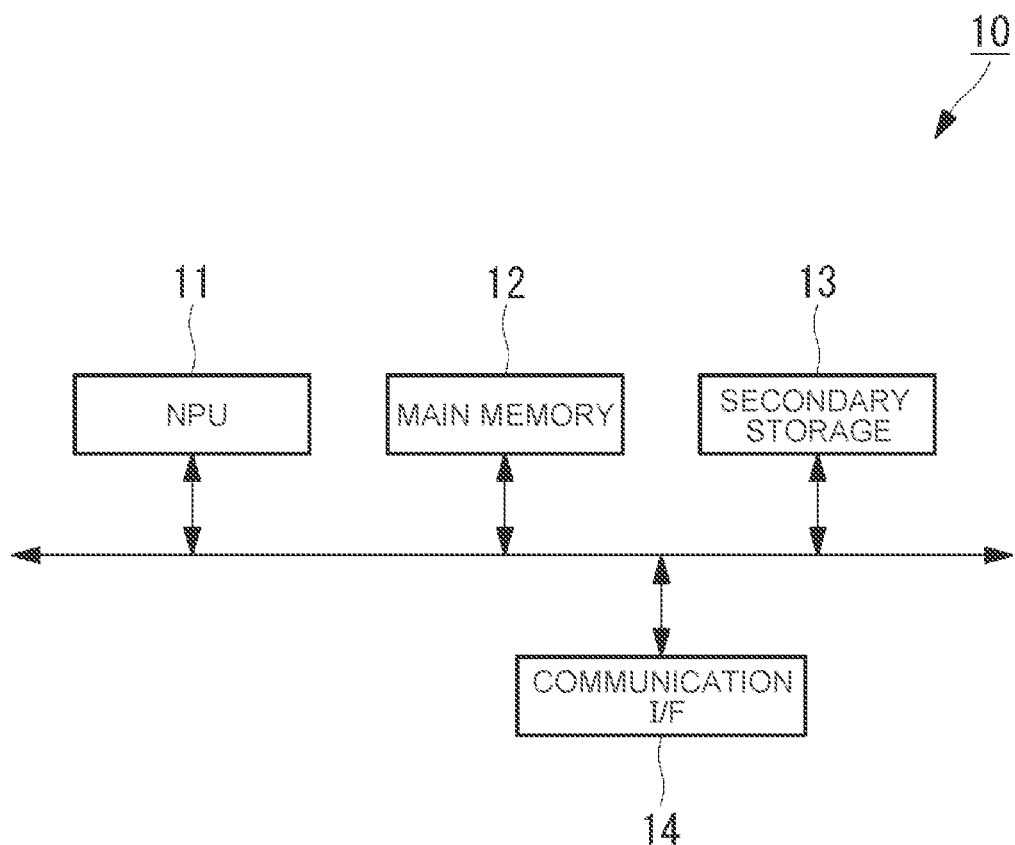
FIG. 2 is a diagram illustrating an example of a hardware configuration of the camera module according to the first embodiment of the present disclosure.

FIG. 2 is a diagram illustrating an example of a hardware configuration of the camera module 1 according to the present embodiment. As illustrated in FIG. 2, the image processing unit 10 includes, for example, a neural network processing unit (NPU) 11, a main memory 12, a secondary storage (memory) 13, and a communication interface 14. These units are connected to each other directly or indirectly through buses, and perform various processes in cooperation with each other.

The NPU 11, for example, reads various programs (for example, image processing programs), which are stored in the secondary storage 13 connected via a bus, to the main memory 12, and performs information processing and arithmetic operations to implement various functions described later.

The main memory 12 is formed by a writable memory such as, for example, a cache memory or a random access memory (RAM), and is used as a work area for reading execution programs of the NPU 11 and for writing the data processed by the execution programs or the like.

The secondary storage 13 is a non-transitory computer readable storage medium. Examples of the secondary storage 13 include a magnetic disk, a magnetic optical disk, a CD-ROM, a DVD-ROM, a semiconductor memory, and the like. Examples of the secondary storage 13 include a read only memory (ROM), a hard disk drive (HDD), a solid state drive (SSD) flash memory, and the like. The secondary storage 13 stores, for example, various programs (firmware) for implementing functions described later and various data required to implement various processes. There may be a plurality of secondary storages 13, and the respective secondary storages 13 may store the above-mentioned programs and data separately.

Various programs (for example, firmware) and the like may be installed in the secondary storage 13 in advance at the time of manufacturing, or may be distributed via wired or wireless communication means or the like.

The communication interface 14 functions as an interface for communicating with other devices connected to a network, and for sending and receiving information. For example, the communication interface 14 communicates with other devices by wired or wireless communication. Wireless communication includes communication through lines such as Bluetooth (registered trademark), Wi-Fi, mobile communication systems (3G, 4G, 5G, 6G, LTE, and the like), and wireless LAN. An example of wired communication is communication through lines such as wired local area network (LAN) or the like.

Figures 3, 4, 5:
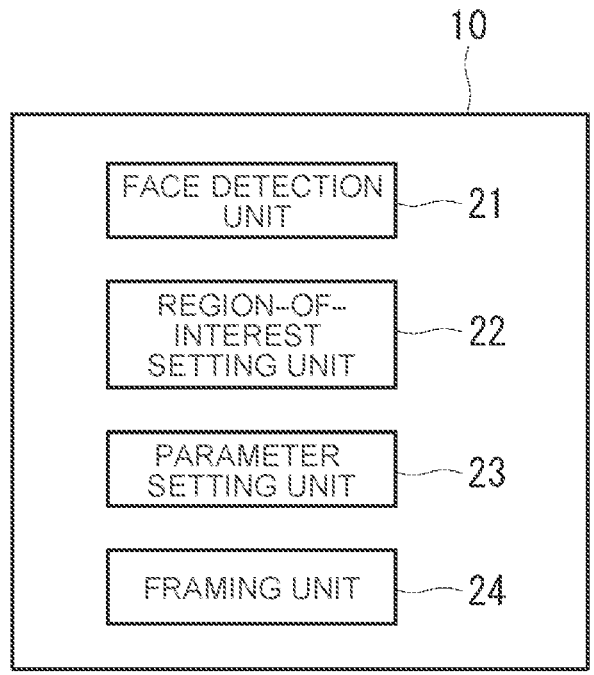
FIG. 3 is a functional configuration diagram illustrating an example of image processing functions of the camera module according to the first embodiment of the present disclosure.
FIG. 4 is a diagram illustrating an example of parameter information according to the first embodiment of the present disclosure.
FIG. 5 is a diagram illustrating another example of parameter information according to the first embodiment of the present disclosure.

FIG. 3 is a functional configuration diagram illustrating an example of image processing functions of the camera module 1 according to the present embodiment. As illustrated in FIG. 3, the image processing unit 10 includes a face detection unit 21, a region-of-interest setting unit 22, a parameter setting unit 23, and a framing unit 24.

The face detection unit 21 detects faces included in an image acquired by the camera 2. For example, the face detection unit 21 extracts feature points of the faces included in the image and detects the faces using the extracted feature points. Since a number of well-known techniques for face detection have been proposed, any of these known techniques may be adopted as appropriate.

The region-of-interest setting unit 22 sets a region of interest (ROI) on the basis of the feature points of the faces detected by the face detection unit 21.

The parameter setting unit 23 sets a reaction parameter of framing according to the number of detected faces, in other words, the number of people included in the image. For example, the parameter setting unit 23 has parameter information that is registered with the number of faces included in the image and the reaction parameter of framing associated with each other, and sets the reaction parameter corresponding to the number of faces included in the image by acquiring the reaction parameter from the parameter information.

FIG. 4 illustrates an example of the parameter information. In the parameter information, a first parameter "3" is set as a reaction parameter corresponding to the number of faces that is 1 or more and less than 3, a second parameter "2" is set as a reaction parameter corresponding to the number of faces that is 3 or more and less than 6, and a third parameter "1" is set as a reaction parameter corresponding to the number of faces that is 6 or more. The smaller the value of the parameter is, the slower the framing reaction is. In the parameter information illustrated in FIG. 4, the number of faces is divided into three levels and a reaction parameter is set for each level. The level classification in the number of faces, however, is not limited to this example. For example, the number of faces may be divided into two levels, or into three or more levels.

An example of a reaction parameter is a sensitivity parameter, which is related to the sensitivity of framing. The sensitivity parameter is, for example, a parameter related to a response time from the time when the execution conditions for framing are met to the time when framing is performed, and the smaller the value of the sensitivity parameter is, the longer the response time is. In this embodiment, the value of the sensitivity parameter is set to decrease as the number of faces increases.

Another example of a reaction parameter is a velocity parameter, which is related to the speed of framing. The velocity parameter is the speed of performing framing, and the smaller the value of the velocity parameter is, the slower the vertical and horizontal movement and the depth movement (zooming) of the frame are. In this embodiment, the value of the velocity parameter is set to decrease as the number of faces increases.

Moreover, the reaction parameter may be formed of a combination of the sensitivity parameter and the velocity parameter, as illustrated in FIG. 5. The threshold of the number of faces for changing the velocity parameter may be different from the threshold of the number of faces for changing the sensitivity parameter. For example, in the parameter information illustrated in FIG. 5, the common thresholds for the number of faces are set to "3" and "6," but the thresholds are not limited thereto. For example, for the sensitivity parameter, the thresholds for the number of faces are set to "3" and "6," and for the velocity parameter, the thresholds for the number of faces may be set to "2," "4," and "6."

The framing unit 24 performs framing of the images acquired by the camera 2 using the set reaction parameter. Specifically, the framing unit 24 adjusts the position of the image in the vertical, horizontal, and depth directions using the set reaction parameter. In other words, framing is image processing that includes vertical/horizontal position adjustment and zoom adjustment.

Figure 6:
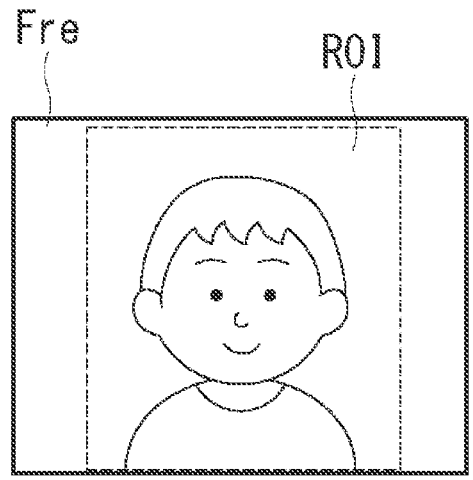
FIG. 6 is a diagram describing an example of auto-framing performed by a framing unit according to the first embodiment of the present disclosure.

For example, the framing unit 24 has a reference frame Fre as illustrated in FIG. 6. In addition, in the case where a part of the region of interest ROI exceeds the reference frame Fre, the framing unit 24 determines that the framing condition is satisfied and performs framing. Moreover, in the case where thereafter the whole area of the region of interest ROI is encompassed by the reference frame Fre, then the framing unit 24 determines that the framing condition is satisfied and framing is performed.

Figure 7:
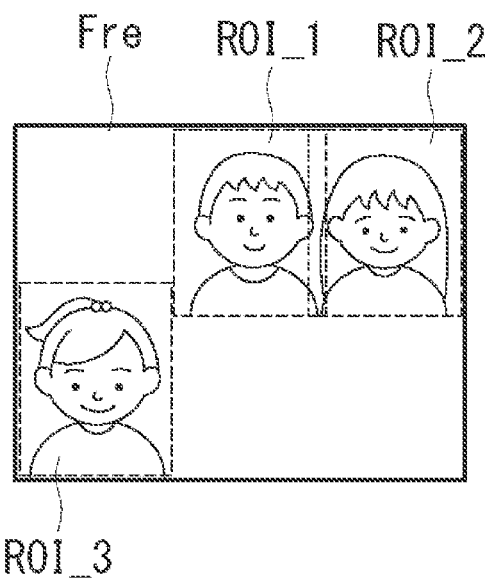
FIG. 7 is a diagram describing an example of auto-framing performed by the framing unit according to the first embodiment of the present disclosure.

As illustrated in FIG. 7, in the case where a plurality of regions of interest ROI_1 to ROI_3 are set in an image due to the inclusion of a plurality of faces in the image and when a part of any of the regions of interest ROI_1 to ROI_3 exceeds the reference frame Fre, the framing unit 24 determines that the framing condition is satisfied and performs framing. When the entire area of the region of interest ROI is encompassed by the reference frame Fre, the framing unit 24 determines that the framing condition is satisfied and performs framing.

Note that the framing process itself is a well-known technique and therefore not limited to the above method, and other well-known techniques may be employed as needed.

Figure 8:
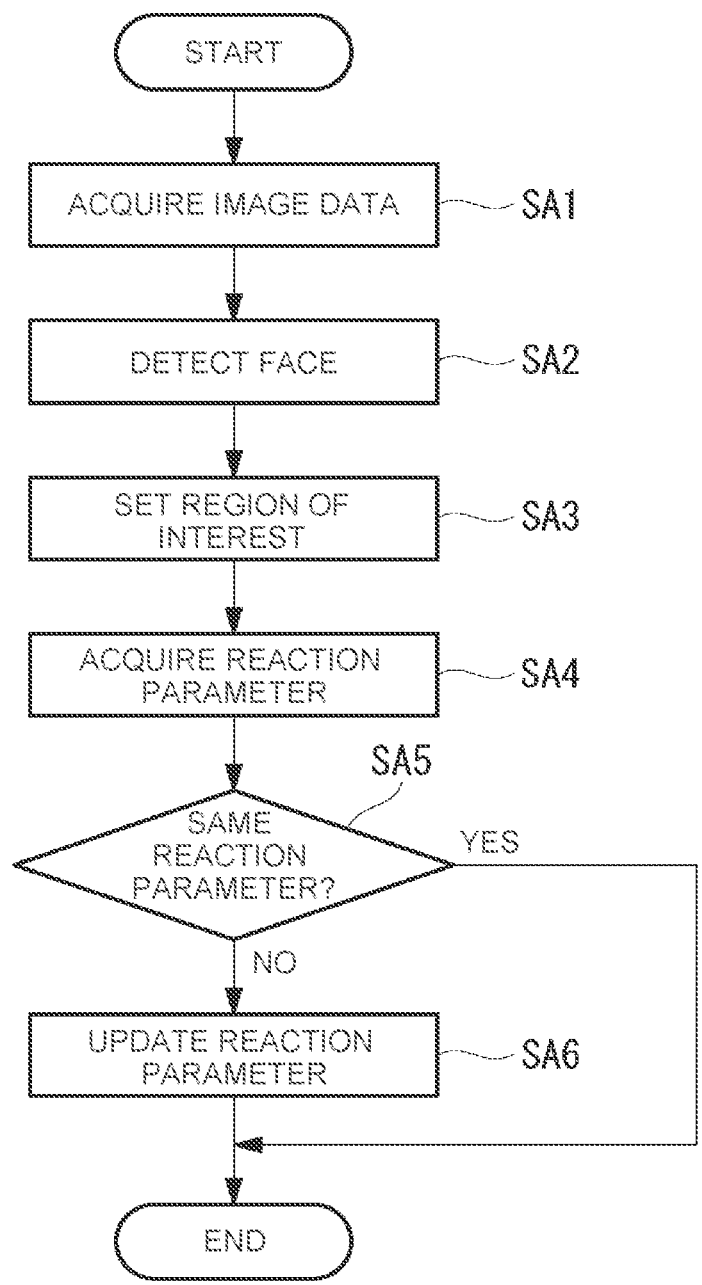
FIG. 8 is a flowchart illustrating an example of a processing procedure for an image processing method performed by the camera module according to the first embodiment of the present disclosure.

Subsequently, the image processing method performed by the camera module 1 is described with reference to FIG. 8. FIG. 8 is a flowchart illustrating an example of the processing procedure of the image processing method according to this embodiment. For example, the following processes are repeatedly performed at predetermined time intervals or for each predetermined number of image frames input from the camera 2.

As illustrated in FIG. 8, first, the image data is acquired from the camera 2 (SA1), faces included in the image are detected (SA2), and regions of interest are set based on feature points of the detected faces (SA3). Subsequently, the reaction parameter corresponding to the number of detected faces is acquired from the parameter information (SA4). Then, whether the acquired reaction parameter is the same as the currently-set reaction parameter is determined (SA5), and in the case where the reaction parameter is the same (SA5: YES), the process is terminated. On the other hand, in the case where the acquired reaction parameter is different from the currently-set reaction parameter (SA5: NO), the reaction parameter used for framing is updated (SA6) and the process is terminated.

As described hereinabove, according to the camera module (information processing system) 1, the image processing method, and the image processing program of this embodiment, the reaction parameter for framing is set according to the number of faces included in the image, and the image framing is performed using the set reaction parameter. Therefore, an appropriate reaction parameter is able to be set according to the number of faces.

Specifically, the reaction parameter is set so that the framing reaction is slower as the number of faces included in the image increases, which makes it possible to slow down the framing reaction as the number of faces included in the image is greater. This enables a reduction in the shaking of the image, which has been a conventional problem, and enables an improvement of user experience.

Second Embodiment

Subsequently, an information processing system, an image processing method, and an image processing program according to a second embodiment of the present disclosure are described. The camera module (information processing system) according to this embodiment differs from the camera module of the first embodiment described above in that the image processing unit 10*a* further includes a determination unit 25 and that the parameter setting unit 23 sets a reaction parameter according to the determination result of the determination unit 25, as illustrated in FIG. 9.

Hereinafter, the same reference numerals are used for the common components as in the first embodiment and the description thereof is omitted, and the differences are mainly described.

Figure 9:
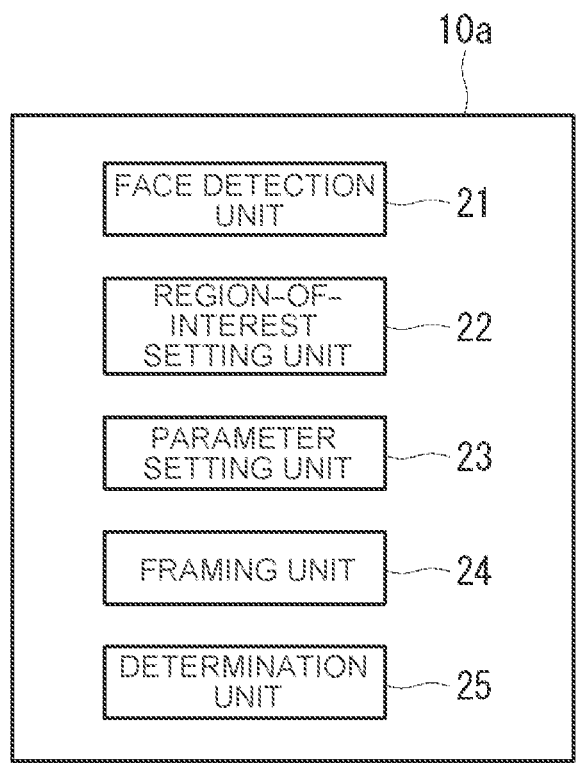
FIG. 9 is a functional configuration diagram illustrating an example of image processing functions of a camera module according to a second embodiment of the present disclosure.

FIG. 9 is a functional configuration diagram illustrating an example of image processing functions of the camera module of this embodiment. As illustrated in FIG. 9, the image processing unit 10*a* of this embodiment further includes a determination unit 25 that determines whether the number of faces detected by the face detection unit 21 has increased, compared to the image processing unit 10 of the first embodiment.

In the case where the determination unit 25 determines that the number of faces has increased, the parameter setting unit 23 determines whether the period of time until the number of faces increases, in other words, the period of time during which the same number of faces is maintained is equal to or longer than a predetermined period of time. When the period of time until the number of faces increases is equal to or longer than the predetermined period of time, the reaction parameter that slows down the framing the most is set.

For example, in the case where a participant attends a meeting late after a predetermined period of time has elapsed since the meeting started, it is undesirable that framing is performed in response to the late participant's movement, since it may interfere with the meeting.

Therefore, in this embodiment, in the case where the number of faces included in the image is determined to have increased, and the period of time until the number of faces increases is equal to or longer than a predetermined period of time, the reaction parameter is set to slow down the framing the most. This makes it possible to reduce the effect of framing in response to the movement of a person who attends the meeting late.

As an alternative to the above aspect, the framing unit 24 may stop framing for a predetermined period of time in the case where the period of time until the number of faces changes is equal to or longer than a predetermined period of time. According to this aspect, since framing itself is stopped for a predetermined period of time, it is possible to further reduce the effect of framing in response to the movement of a person who is late to attend a meeting.

Third Embodiment

Next, an information processing system, an image processing method, and an image processing program according to a third embodiment of the present disclosure are described. A camera module (information processing system) of this embodiment differs, in a framing method by a framing unit 24b, from the first embodiment described above.

Hereinafter, the same reference numerals are used for the components that are common to the components of the first embodiment and the description thereof is omitted, and the differences are mainly described.

Figure 10:
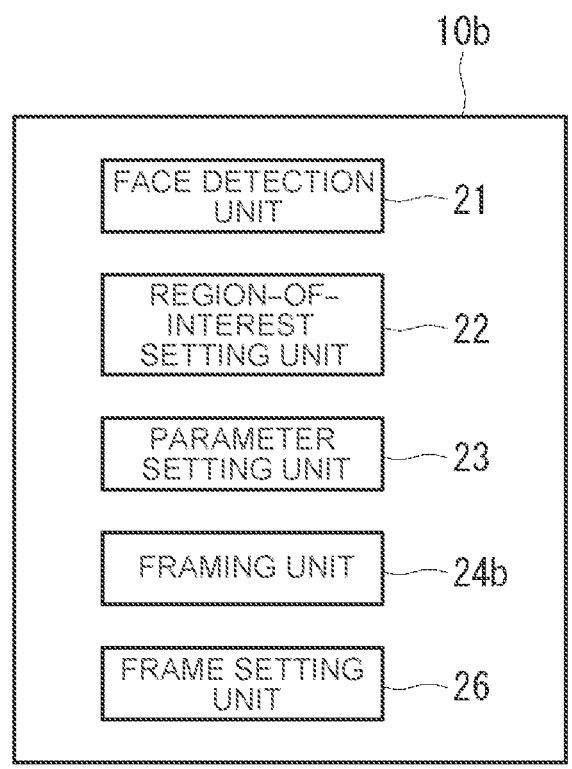
FIG. 10 is a functional configuration diagram illustrating an example of image processing functions of a camera module according to a third embodiment of the present disclosure.

FIG. 10 is a functional configuration diagram illustrating an example of image processing functions of the camera module according to the third embodiment of the present disclosure. The image processing unit 10b of this embodiment further includes a frame setting unit 26. The frame setting unit 26 has, for example, a plurality of frame sets composed of a combination of an enlarged frame Fla and a reduced frame Fsm.

The enlarged frame Fla is a frame that encompasses the reference frame Fre described in the first embodiment and has a larger size than the reference frame Fre. The reduced frame Fsm is a frame that has the same size as the reference frame Fre, or that is encompassed by the reference frame Fre and has a smaller size than the reference frame Fre. The frame setting unit 26 sets a frame set according to the number of faces included in the image.

Figure 11:
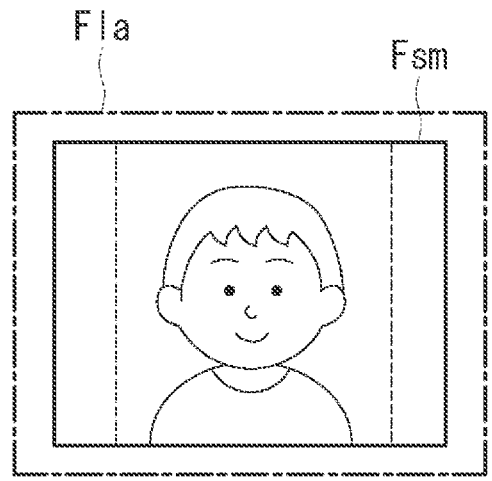
FIG. 11 is a diagram illustrating an example of a frame set in the case where there is only one face in the image in the third embodiment of the present disclosure.

For example, FIG. 11 illustrates an example of a frame set for a case where an image contains a single face. As illustrated in FIG. 11, in the case where the image contains a single face, the reduced frame Fsm is assumed to be the same frame as the reference frame Fre. In addition, the enlarged frame Fla is assumed to have a size of, for example, the reference frame Fre enlarged by +15% in height and +10% in width.

Figure 12:
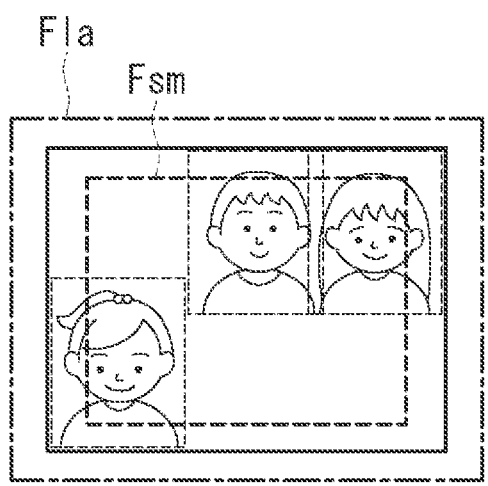
FIG. 12 is a diagram illustrating an example of a frame set in the case where there is a plurality of faces in the image in the third embodiment of the present disclosure.

FIG. 12 illustrates an example of a frame set for a case where an image includes a plurality of faces. As illustrated in FIG. 12, in the case where the image includes the plurality of faces, the reduced frame Fsm is assumed to be a frame smaller in size than the reference frame Fre. For example, the size of the reduced frame Fsm is −5% smaller in height and −10% smaller in width than the reference frame Fre. In addition, the enlarged frame Fla is smaller in size than, for example, the case where the image includes a single face. As an example, the enlarged frame Fla is assumed to have a size of the reference frame Fre enlarged by +10% in height and +5% in width.

In this manner, the size of the enlarged frame Fla in the case where an image includes a single face is set larger than the enlarged frame Fla in the case where an image includes a plurality of faces. This is because, for example, when an image includes a single face, the frame is zoomed larger than in the case where an image includes a plurality of faces, and unless the enlarged frame Fla is set to an appropriate size, framing will be sensitive to slight movements of the subject, and framing may be repeated frequently.

According to this embodiment, the enlarged frame Fla in the case where an image includes a single face is set larger than the enlarged frame Fla in the case where an image includes a plurality of faces, thereby enabling a reduction in the frequent repetition of framing and in the shaking of the image.

The framing unit 24 determines that the framing condition is satisfied and performs framing when a part of any region of interest set in the image exceeds the enlarged frame Fla set by the frame setting unit 26, or when the entire area of any region of interest ROI is encompassed by the reduced frame Fsm set by the frame setting unit 26.

According to this configuration, the frame setting unit 26 sets a frame set according to the number of faces included in the image from among the plurality of frame sets. Then, framing is performed based on the set frame set, in other words, an enlarged frame Fla and a reduced frame Fsm. Thus, the frames used for framing have hysteresis and therefore the frequency of framing is able to be reduced.

In addition, as described in the first embodiment above, framing is performed based on the reaction parameter depending on the number of faces included in the image, thereby enabling the reaction of framing to be slowed down as the number of faces included in the image increases.

According to the above, it is possible to effectively reduce the shaking of the image, which has been a conventional problem.

Although the present disclosure has been described by using the embodiments in the above, the technical scope of the present disclosure is not limited to the scope described in the above embodiments. Various settings or improvements may be made to the above embodiments without departing from the gist of the disclosure, and the embodiments with those settings or improvements are also included in the technical scope of the present disclosure. The above embodiments may also be combined as appropriate.

The process flows described in the above embodiments are merely illustrative, and unnecessary steps may be deleted, new steps may be added, or the order of processing may be replaced to the extent of not departing from the scope of this disclosure.

In the embodiments described above, the case in which the camera module 1 includes the image processing unit 10 and the camera module 1 functions as an information processing system has been described as an example, but the present disclosure is not limited thereto. For example, the image processing unit 10 may be provided in the information processing device (not illustrated) connected to the camera 2, and the information processing system may be implemented by the camera 2 and the information processing device. In this case, the camera 2 may be provided as an integral part of the information processing device, or it may be provided as an external device electrically connected to the information processing device. Examples of the information processing device include a laptop PC, a desktop PC, a tablet terminal, a smartphone, and the like.

The invention claimed is:

1. An information processing system comprising:
a camera;
a face detection unit that detects how many faces are included in an image acquired by the camera;
a parameter setting unit that sets a reaction parameter for framing according to a specific number of detected faces, wherein the specific number falls within one of a plurality of pre-set, non-overlapping ranges of numbers; and
a framing unit that performs framing of the image using the set reaction parameter.

2. The information processing system according to claim 1, wherein the parameter setting unit sets the reaction parameter so that a reaction of framing is slowed down as the specific number of faces included in the image increases.

3. An information processing system comprising:
a camera;
a face detection unit that detects how many faces are included in an image acquired by the camera;
a parameter setting unit that sets a reaction parameter for framing according to a specific number of detected faces, wherein the specific number falls within one of a plurality of pre-set, non-overlapping ranges of numbers;

a framing unit that performs framing of the image using the set reaction parameter; and a determination unit that determines whether the specific number of faces detected by the face detection unit has increased, wherein the parameter setting unit sets a reaction parameter that slows down the framing to a maximum in the case where a period of time until the specific number of faces detected increases is equal to or longer than a predetermined period of time.

4. An information processing system comprising:
a camera;
a face detection unit that detects how many faces are included in an image acquired by the camera;
a parameter setting unit that sets a reaction parameter for framing according to a specific number of detected faces, wherein the specific number falls within one of a plurality of pre-set, non-overlapping ranges of numbers;
a framing unit that performs framing of the image using the set reaction parameter; and
a determination unit that determines whether the specific number of faces detected by the face detection unit has increased, wherein the framing unit stops the framing for a predetermined period of time in the case where a period of time until the specific number of faces detected increases is equal to or longer than the predetermined period of time.

5. The information processing system according to claim 1, wherein the parameter setting unit has parameter information in which the specific number of faces included in the image and the reaction parameter are registered in association with each other and sets the reaction parameter corresponding to the specific number of faces included in the image by acquiring the reaction parameter from the parameter information.

6. The information processing system according to claim 1, wherein the reaction parameter includes at least one of a sensitivity parameter, which is related to sensitivity of the framing, and a velocity parameter, which is related to speed of the framing.

7. An information processing system comprising:
a camera;
a face detection unit that detects how many faces are included in an image acquired by the camera;
a parameter setting unit that sets a reaction parameter for framing according to a specific number of detected faces, wherein the specific number falls within one of a plurality of pre-set, non-overlapping ranges of numbers;
a framing unit that performs framing of the image using the set reaction parameter;
a region-of-interest setting unit that sets a region of interest based on a feature value of a detected face; and
a frame setting unit that has a plurality of frame sets each composed of a combination of an enlarged frame that encompasses a reference frame and is larger in size than the reference frame and a reduced frame that has the same size as the reference frame or that is encompassed by the reference frame and smaller in size than the reference frame to set a frame set corresponding to the specific number of faces included in the image,
wherein the framing unit performs framing in the case where any of the regions of interest exceeds the enlarged frame or in the case where the entire area of any of the regions of interest is included in the reduced frame.

8. An image processing method, in which a computer performs the steps of:
detecting how many faces are included in an image acquired by a camera;
setting a reaction parameter for framing according to a specific number of detected faces, wherein the specific number falls within one of a plurality of pre-set, non-overlapping ranges of numbers; and
framing the image using the set reaction parameter.

9. A non-transitory computer readable storage medium for causing a computer to perform the image processing method according to claim 8.

* * * * *